US012729942B2

(12) United States Patent
Vabnick

(10) Patent No.: US 12,729,942 B2
(45) Date of Patent: Sep. 8, 2026

(54) PRESS DEVICE AND METHOD OF OPERATING THE SAME

(71) Applicant: Federal Bureau of Investigation, Washington, DC (US)

(72) Inventor: Ian B. Vabnick, Fredericksburg, VA (US)

(73) Assignee: Federal Bureau of Investigation, Washington, DC (US)

( * ) Notice: Subject to any disclaimer, the term of this patent is extended or adjusted under 35 U.S.C. 154(b) by 390 days.

(21) Appl. No.: 18/371,404

(22) Filed: Sep. 21, 2023

(65) Prior Publication Data

US 2025/0231013 A1 Jul. 17, 2025

Related U.S. Application Data

(63) Continuation-in-part of application No. 18/109,438, filed on Feb. 14, 2023, now Pat. No. 12,584,722, and (Continued)

(51) Int. Cl.
*B30B 9/32* (2006.01)
*B30B 15/04* (2006.01)
(Continued)

(52) U.S. Cl.
CPC ................ *F42D 5/04* (2013.01); *B30B 9/326* (2013.01); *B30B 15/04* (2013.01); *B30B 15/08* (2013.01)

(58) Field of Classification Search
CPC ..... B30B 15/04; B30B 15/061; B30B 15/065; B30B 1/001; B30B 1/007; B30B 1/32;
(Continued)

(56) References Cited

U.S. PATENT DOCUMENTS 7,255,143 B1 * 8/2007 Babcock .................. B27L 7/06 144/195.1
10,836,069 B2 11/2020 Banjo et al.
(Continued)

FOREIGN PATENT DOCUMENTS

EP 2386391 A2 * 11/2011 ................ B27L 7/00
EP 2832510 A1 * 2/2015 ................ B27L 7/00
WO WO-2017100822 A1 * 6/2017 ................ B27L 7/06

OTHER PUBLICATIONS

English translation of EP 2 386 391 A2 (5 pages), retrieved in Oct. 2025. (Year: 2025).*

(Continued)

*Primary Examiner* — Jimmy T Nguyen
(74) *Attorney, Agent, or Firm* — Andrew C. Stark; Jonathan W. Parthum

(57) ABSTRACT

A press device may include a frame comprising a target base disposed over an upper portion thereof, a back support extending vertically from the frame adjacent to the target base, and a linear actuator mounted to the frame and positioned to actuate along a translation axis substantially parallel to the target base and toward the back support. The press device may also include a fracturing tool coupled to first linear actuator to actuate along the translation axis over the target base, and a positioning actuator coupled to the frame to actuate along the target base in a direction substantially perpendicular to the translation axis.

20 Claims, 11 Drawing Sheets

Related U.S. Application Data a continuation-in-part of application No. 18/093,277, filed on Jan. 4, 2023, now Pat. No. 12,281,886, said application No. 18/109,438 is a continuation-in-part of application No. 18/093,277, filed on Jan. 4, 2023, now Pat. No. 12,281,886.

(60) Provisional application No. 63/309,659, filed on Feb. 14, 2022, provisional application No. 63/296,716, filed on Jan. 5, 2022.

(51) Int. Cl.
*B30B 15/08* (2006.01)
*F42D 5/04* (2006.01)

(58) Field of Classification Search
CPC ......... B30B 7/04; B30B 9/3014; B30B 15/08; B30B 9/32; B30B 9/326; B27L 7/00; B27L 7/06; F42B 33/06; F42D 5/04; Y10T 83/2172
USPC .......................................... 100/218, 226, 232
See application file for complete search history.

(56) References Cited

U.S. PATENT DOCUMENTS

2002/0046661 A1 4/2002 Hawkins
2016/0318206 A1* 11/2016 Banjo ....................... B27L 7/06

OTHER PUBLICATIONS

Hydraulic Presses, Dake Corp., Web page https://www.dakecorp.com/products/hydraulic-presses, Nov. 16, 2018, retrieved from Internet Archive Wayback Machine http://web.archive.org/web/20181116201257/https://www.dakecorp.com/products/hydraulic-presses on Sep. 12, 2023.

National Bomb Squad Commanders Advisory Board, Law Enforcement Ground Robots, GRCCE Conference, Apr. 7, 2015 [retrieved on Sep. 12, 2023], pp. 1-41, retrieved from the Internet: https://ndiastorage.blob.core.usgovcloudapi.net/ndia/2015/grcce/Heaven.pdf.

Semi-Autonomous Pipe Bomb End Cap Remover, DHS Science and Technology Directorate, May 16, 2012 [retrieved on Sep. 12, 2023], p. 1, retrieved from the Internet: https://www.dhs.gov/sites/default/files/publications/Semi-Autonomous%20Pipe%20Bomb%20End%20Cap%20Remover-SAPBER_0.pdf.

ANT Applied New Technologies AG, MACE series EOD & IEDD Water Abrasive Suspension Cutting, Nov. 2022 [retrieved on Sep. 12, 2023], pp. 1-20, retrieved from the Internet: https://ant-ag.com/wp-content/uploads/2023/02/MACE-Broschuere-ENG-November-22.pdf.

6 Quart Double Acting Hydraulic Pump, VEVOR, Web page https://www.vevor.com/hydraulic-power-unit-c_10089/6-quart-double-acting-hydraulic-pump-dump-trailer-unloading-lift-crane-p_010984202930, May 22, 2022, retrieved from Internet Archive Wayback Machine http://web.archive.org/web/20220522234207/https://www.vevor.com/hydraulic-power-unit-c_10089/6-quart-double-acting-hydraulic-pump-dump-trailer-unloading-lift-crane-p_010984202930 on Sep. 12, 2023.

Air Hydraulic Pump, VEVOR, Web page https://www.vevor.com/air-hydraulic-pump-c_10085/vevor-air-hydraulic-pump-hydraulic-foot-pump-10-000-psi-with-hose-and-spray-p_010326240346, May 22, 2022, retrieved from Internet Archive Wayback Machine http://web.archive.org/web/20220522035212/https://www.vevor.com/air-hydraulic-pump-c_10085/vevor-air-hydraulic-pump-hydraulic-foot-pump-10-000-psi-with-hose-and-spray-p_010326240346 on Sep. 12, 2023.

* cited by examiner

PRESS DEVICE AND METHOD OF OPERATING THE SAME

CROSS-REFERENCE TO RELATED APPLICATIONS

The present application is a continuation-in-part of, and claims priority to, U.S. patent application Ser. No. 18/109,438, filed on Feb. 14, 2023, which is a continuation-in-part of, and claims priority to, U.S. patent application Ser. No. 18/093,277, filed on Jan. 4, 2023, which is a non-provisional of, and claims priority to, U.S. Provisional Patent Application Ser. No. 63/309,659, filed on Feb. 14, 2022, and U.S. Provisional Patent Application Ser. No. 63/296,716 filed on Jan. 5, 2022. U.S. patent application Ser. No. 18/109,438 is also non-provisional of, and claims priority to, U.S. Provisional Patent Application Ser. No. 63/309,659, filed on Feb. 14, 2022. The present application is also a continuation-in-part of, and claims priority to, U.S. patent application Ser. No. 18/093,277, filed on Jan. 4, 2023, which is a non-provisional of, and claims priority to, U.S. Provisional Patent Application Ser. No. 63/309,659, filed on Feb. 14, 2022, and U.S. Provisional Patent Application Ser. No. 63/296,716 filed on Jan. 5, 2022. The entire disclosures of the above applications are incorporated herein by reference in their entirety.

STATEMENT OF GOVERNMENT SUPPORT

The United States Government has rights in this invention pursuant to the relationship of the Government to at least one inventor.

FIELD OF THE INVENTION

Embodiments of the invention relate generally to press devices used for fracturing and neutralizing explosive devices.

BACKGROUND

Improvised explosive devices (IEDs), such as pipe bombs, can be easy to build and often contain an outer casing made from common materials including steel/iron, polyvinyl chloride (PVC), copper, or cardboard tubing. IED's can be neutralized using significant force to compromise their structural integrity and remove explosive filler from within their casings or to render a fusing system inoperable or separated. Dynamic tools used to neutralize an IED include propellant-driven disrupter cannons and dearmers that fire solid or fluid projectiles at the IED to perforate the outer casing and render the IED inoperable. Depending on the type of disruptor, however, firing a projectile at an IED can introduce shock, friction, and compressive heating that can cause the explosive filler to ignite resulting in explosive fragmentation or an ineffective neutralization of the IED. IED's made with sensitive explosive filler like flash powder are especially vulnerable to ineffective neutralization using dynamic methods.

Quasistatic methods can neutralize explosive devices more slowly than dynamic methods thereby reducing shock, friction, and compressive heating to prevent ineffective neutralization of an IED. A common quasistatic method to neutralize an IED includes using a remote access tool to slowly cut through a bomb casing. The remote access tool may be positioned and operated using a gripper of a remote-controlled robot allowing an operator to be located at a safe distance from the explosive device. For example, a remote access tool may include a pair of jaws used to pinch and shear an explosive device apart. However, pinching some explosive devices can cause excessive compressive stress and frictional heating of its casing causing the explosive filler to ignite. Also, the robot operating the remote access tool could be destroyed if the explosive device detonates.

Press systems provide quasistatic tools for neutralizing explosive devices. Press systems operate using actuators that output high forces, such as hydraulic actuators, electric geared actuators, pneumatic actuators, and impact drivers. A press system typically includes a frame, a target platform, and an actuator mounted to the frame to press an object resting on the target platform. Some press systems have a high center of gravity that can require outriggers, stanchions, or support platforms to provide stability during use. The frame often includes cross members that extend over the target platform to support the actuator above the object. Such frames can be heavy with a large footprint making it difficult to carry or transport to a bomb site. In addition, the frame on certain press systems can obstruct vision and access from a robot used to place the explosive device on the target platform.

Accordingly, a device and method for effectively neutralizing explosive devices is desired. Further, it is desirable to provide an explosives neutralization device with a lightweight and stable frame that facilitates remote operation.

SUMMARY

In accordance with one aspect of the invention, a press device includes a frame including a target base disposed over an upper portion thereof, a back support extending vertically from the frame adjacent to the target base, and a linear actuator mounted to the frame and positioned to actuate along a translation axis substantially parallel to the target base and toward the back support. The press device may also include a fracturing tool coupled to the linear actuator to actuate along the translation axis over the target base, and a first positioning actuator coupled to the frame to actuate along the target base in a direction substantially perpendicular to the translation axis.

In accordance with another aspect of the invention, a press device for fracturing an object includes a frame including a target base disposed on an upper portion thereof and at least one guide rail. The press device may also include a backplate coupled to the target base extending vertically therefrom, and a linear actuator having a first end coupled to the frame and an opposite second end positioned to actuate over the frame toward the backplate. A tool mount may be coupled to the second end of the linear actuator and slidably coupled to the at least one guide rail such that the tool mount translates over the upper portion of the frame along the at least one guide rail when actuated by the linear actuator, and a fracturing tool may be mounted to the tool mount configured to fracture an object in response to actuation of the linear actuator.

In accordance with yet another aspect of the invention, a method for operating a press device includes providing a press device having a frame having a target base disposed over an upper portion thereof, a back support extending vertically from the frame adjacent the target base, a linear actuator mounted to the frame and positioned to actuate along a translation axis substantially parallel to the target base and toward the back support, a fracturing tool coupled to the linear actuator to actuate along the translation axis over the target base, and a first positioning actuator coupled to the frame to actuate along the target base in a direction substantially perpendicular to the translation axis. The method may also include placing an object on the target base between the fracturing tool and the back support, controlling the first positioning actuator to move the object into a desired position aligned with the fracturing tool, connecting a power unit operably to the linear actuator to selectively induce linear translation of the fracturing tool, and operating the power unit to fracture the object with the fracturing tool.

These and other advantages and features of the present invention will be more readily understood from the following detailed description and the accompanying drawings.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

The operating environment of the invention is described herein with respect to a Remote Access Machine (RAM). However, those skilled in the art will appreciate that the invention is equally applicable for use with machines that are not remotely operated. While the invention is described with respect to a press device that ruptures and neutralizes objects, such as explosive devices, embodiments for the invention are equally applicable for use in pressing objects other than explosive devices.

Figure 1:
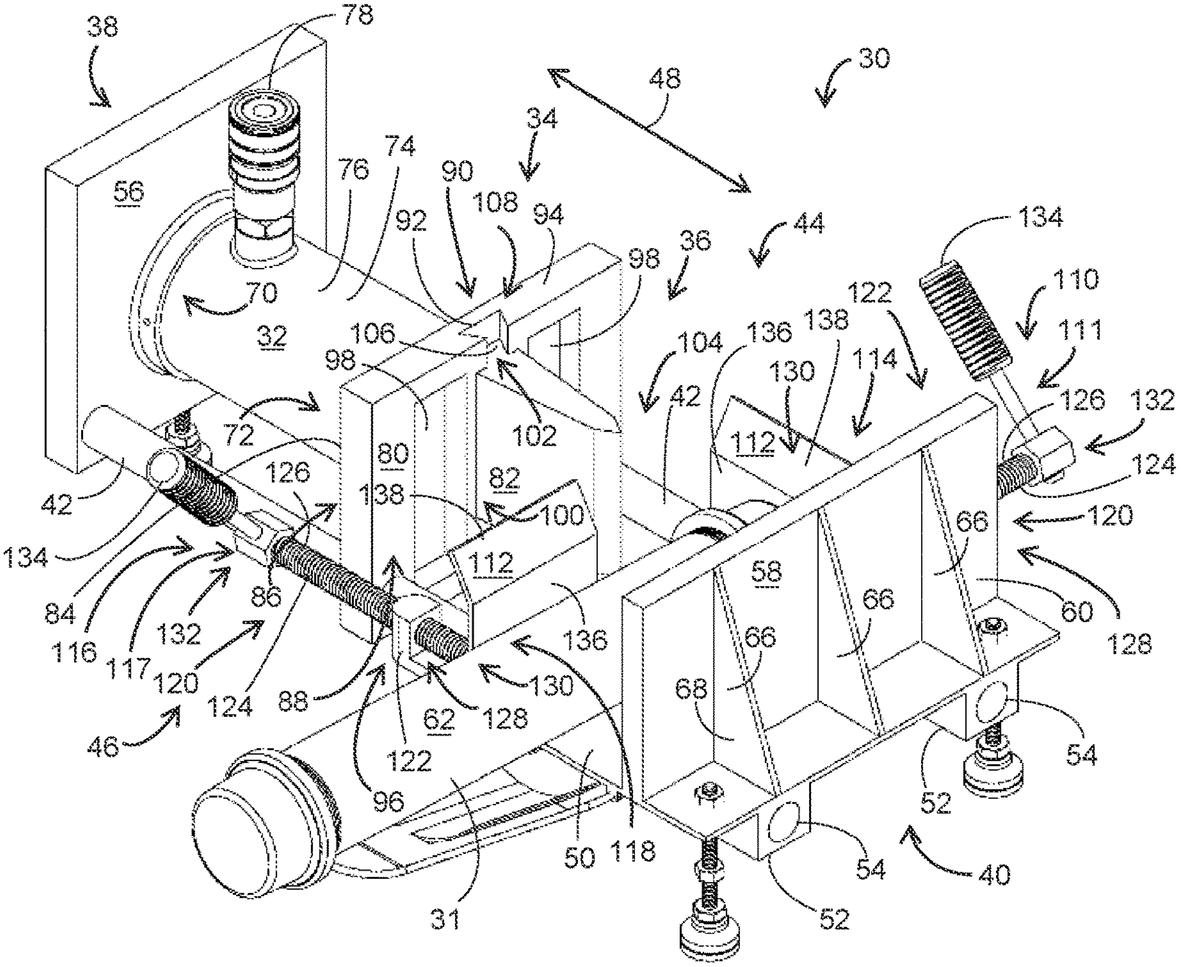
FIG. 1 is an upper perspective view of a press device with an explosive device positioned thereon in a position to be pressed by the press device, according to one example.

Referring to FIG. 1, a press device 30 for fracturing an object 31 is shown, according to an embodiment of the invention. The press device 30 may be operated remotely as a RAM designed to rupture explosive ordnance using an actuator 32 and fracturing tool assembly 34 oriented in a horizontal or recumbent position. A RAM device with a horizontally oriented actuator can have a lower center of gravity than a RAM device with a vertically oriented actuator, which allows for improved mechanical stability and a lighter frame 36. The press device 30 is a field deployable render-safe tool for explosive devices that is lightweight and capable of neutralizing a variety of explosive objects including improvised explosive devices (IEDs) and military ordnance. As a result, the press device 30 may also be referred to as a Remotely Actuated Versatile Explosives Neutralizer (RAVEN).

According to embodiments of the invention, the press device 30 includes the frame 36, also referred to as a main body, having a first end 38 and an opposite second end 40 with a plurality of guide rails 42 extending along opposing sides 44, 46 of the frame 36 in a lengthwise direction 48 from the first end 38 to the second end 40 of the frame 36. The frame 36 may include a target base 50, also referred to as a target platform, disposed on an upper portion thereof. The target base 50 is shown as, although not limited to, a generally rectangular plate mounted on the guide rails 42 proximate to the second end 40 of the frame 36 and extending outward beyond the plurality of guide rails 42 along the sides 44, 46 of the frame 36. The frame 36 may include a pair of rectangular protrusions 52 extending downward from the target base 50 at the second end 40 of the frame 36 to support one end of the guide rails 42. The rectangular protrusions 52 each include a bore 54 extending in the lengthwise direction 48 of the frame 36 to receive one end of the plurality of guide rails 42. The frame 36 may include an endplate 56 positioned at the first end 38 of the frame 36 to support another end of the guide rails 42. The endplate 56 has a generally square profile coupled to and extending vertically from the guide rails 42, though other profiles are possible. In various embodiments of the invention, the frame 36 is made from steel plate and bar stock. For example, the endplate 56 and target base 50 may be made from one half inch thick A36 mild structural steel, and the guide rails 42 may comprise rods made from one half inch diameter A36 mild structural steel.

A backplate 58, also referred to as a back support, is shown coupled to the target base 50 extending vertically therefrom and positioned adjacent to the second end 40 of the frame 36. The backplate 58 may include a rectangular plate 60 mounted on the target base 50 and extending from the first side 44 to the second side 46 of the frame 36 in a direction perpendicular to the guide rails 42. An object being pressed by the press device 30 may rest on the target base 50 and may be supported against the pressing motion by the backplate 58. FIG. 1 shows the object 31 as an explosive device 62 seated on the target base 50 to be pressed against the backplate 58. The term “explosive device” is broadly used to denote an improvised explosive device (IED), a bomb, firework, a chemically reactive device, or military ordnance (e.g., mortar shell, bomlet, submunition, rocket, or military grenade). For example, IEDs may include elbow pipe fittings, pipe nipples, civilian improvised grenades, copper or cardboard cased, and PVC pipes, each being filled with at least one explosive such as FFFg black powder, flash powder or smokeless powder. In embodiments of the invention, the backplate 58 includes the plate 60 with a plurality of reinforcement members 66 or ribs extending toward the second end 40 of the frame 36 and coupled to the target base 50. The reinforcement members 66 may include triangular plates 68 with opposing perpendicular edges coupled respectively to the backplate 58 and the target base 50. The reinforcement members 66 support the backplate 58 which can experience high forces from the linear actuator 32. The use of reinforcement members 66 behind the backplate 58 reduces the overall size and weight requirements of the backplate 58 while ensuring the backplate 58 can support large forces used to neutralize many types of IEDs. In embodiments of the invention, the backplate 58 is made from one half inch thick A36 mild structural steel.

The linear actuator 32 is shown mounted to the frame 36 to provide the motive force required to press an object with the press device 30. The linear actuator 32 may include a first end 70 coupled to the endplate 56 of the frame 36 and a second end 72 facing the backplate 58 and positioned slightly higher than the target base 50. Thus, the linear actuator 32 may have a first end 70 coupled to the frame 36 and an opposite second end 72 positioned to actuate over the frame 36 toward the backplate 58. The linear actuator 32 may be a double-acting actuator that actuates in opposing directions such that the second end 72 actuates toward and away from the backplate 58. The linear actuator 32 may be a fluid pressure actuator 74 (e.g. a hydraulic cylinder or a pneumatic cylinder) or a gear-driven actuating system powered by an electric motor, but is shown in FIG. 1 as a hydraulic cylinder 76. The hydraulic cylinder 76 may receive pressurized hydraulic fluid through a hose coupling 78 which could be a quick-connect hose coupling. The hydraulic cylinder 76 includes an interior piston that amplifies the force generated by a power unit (not shown in FIG. 1) coupled to supply the hydraulic fluid to the hose coupling 78. In embodiments of the invention, the hydraulic cylinder 76 is a double-acting hydraulic cylinder that includes two quick-connect hose couplings used to connect a fluid source to first and second chambers within the cylinder that actuate the piston in opposing directions. The linear actuator 32 can be removably connected to the endplate 56. Thus, the press device 30 could operate with linear actuators 32 of a different size or power rating and could accommodate commercial off-the-shelf actuators for reduced cost and increased selection. In embodiments of the invention, the hydraulic cylinder 76 has an output capacity of up to 20-100 tons or greater.

The fracturing tool assembly 34, also referred to as a press tool assembly, couples to the linear actuator 32 to neutralize the explosive device 62 positioned on the target base 50. The fracturing tool assembly 34 may include a tool mount 80 coupled to the second end 72 of the linear actuator 32 and a fracturing tool 82 mounted on the tool mount 80. The tool mount 80 includes a removable connection 90 to the fracturing tool 82 so that different tools can be swapped out of the fracturing tool assembly 34. Accordingly, the fracturing tool assembly 34 can support tools of different geometry or material characteristics appropriate for neutralizing a particular explosive device such as for example those illustrated in FIGS. 8-10. The fracturing tool assembly 34 may be driven forward at variable rates by the linear actuator 32 to press the explosive device 62 against the backplate 58 with the fracturing tool 82 thereby compromising the structural integrity of the explosive device 62. The press device 30 can fracture, cut, or rupture the casing of the explosive device 62 using the fracturing tool 82 to access its interior, vent it, and/or facilitate explosive filler removal. The fracturing tool 82 could also be used to jam or separate a bomb fuse.

The tool mount 80 is shown as, although not limited to, a generally rectangular plate 84 with a first side 86 mounted to the second end 72 of the linear actuator 32 and an opposite second side 88 having the connection 90 for receiving the fracturing tool 82. According to embodiments, the tool mount 80 has a dovetail slot 92 formed in the second side 88 to facilitate rapid changing of different fracturing tools 82. The dovetail slot 92 may extend vertically from a top end 94 toward a bottom end 96 of the tool mount 80 but terminating short of the bottom end 96 so that gravity holds the fracturing tool 82 in the tool mount 80 without any additional locking mechanisms. The tool mount 80 may include a pair of rectangular indentations 98 on the second side 88 to reduce the weight of the tool mount 80. The tool mount 80 may also couple to the guide rails 42 to support the fracturing tool 82 on the frame 36 and thus act as a support guide for the fracturing tool 82. The tool mount 80 may be slidably coupled to at least one guide rail 42 such that the tool mount 80 translates over the upper portion of the frame 36 along at least one guide rail 42 when actuated by the linear actuator 32. In various embodiments, the tool mount 80 is made from one half inch thick A36 mild structural steel.

The fracturing tool 82 has a first end 100 with a connection 102 for mounting to the tool mount 80 and an opposite second end 104 that contacts the object to be pressed or fractured. FIG. 1 shows the tool mount 80 having the dovetail slot 92 and the fracturing tool 82 having a mating tail 106 inserted into the slot thereby creating a dovetail connection 108 between the tool mount 80 and the fracturing tool 82. Accordingly, the fracturing tool 82 may be mounted to the tool mount 80 to fracture an object supported against the backplate 58 in response to actuation of the linear actuator 32. Alternatively, the fracturing tool 82 could be an integral component of the tool mount 80 such that the fracturing tool assembly 34 is a single component. As explained in more detail herein, the fracturing tool 82 may include a wedge, blade, punch, ram, etc.

According to embodiments of the invention, the press device 30 includes a first positioning actuator 110 located along a side of the frame 36 and adjacent to the backplate 58. The first positioning actuator 110 may include a linear actuator 111 that actuates transverse to the lengthwise direction 48 of the frame 36. The first positioning actuator 110 may be coupled to the frame 36 to position an object on the target base 50 in a desired position aligned with the fracturing tool 82. The first positioning actuator 110 is shown coupled to the first side 44 of the frame 36 to actuate over the target base 50 in a direction parallel to a length of the backplate 58. The first positioning actuator 110 may include a stop 112 at a first end 114 that contacts the object to be pressed and pushes the object into a desired position aligned with the fracturing tool 82.

According to embodiments of the invention, the press device 30 includes a second positioning actuator 116 located along a side of the frame 36 opposite the first positioning actuator 110. The second positioning actuator 116 may include a linear actuator 117 that actuates parallel to the lengthwise direction 48 of the frame 36. The second positioning actuator 116 may be coupled to the frame 36 to hold the object against the backplate 58. The second positioning actuator 116 is shown coupled to the second side 46 of the frame 36 on a side of the target base 50 opposite the backplate 58 to actuate over the target base 50 in a direction normal to the backplate 58. The second positioning actuator 116 may include a stop 112 at a first end 118 that contacts the object to be pressed and pushes the object against the backplate 58 such that the second positioning actuator 116 acts as a vice with the backplate 58

The first and second positioning actuators 110, 116 may each comprise a translation screw 120. In embodiments of the invention, the translation screw 120 includes a female member 122 mounted to the frame 36 and a male member 124 threadably connected to the female member 122, with the male member 124 including a threaded rod 126 or screw and the female member 122 including a threaded hole 128 to receive the threaded rod or screw. A first end 130 of the threaded rod 126 may include the stop 112 while a second end 132 of the rod may include a handle 134 or another mechanism to rotate the rod. Instead of a handle 134, a motor could be coupled to the second end 132 of each rod 126 and remotely controlled to actuate the first and second positioning actuators 110, 116. The motors could be coupled to the rods 126 via a gearing system which not only provides a convenient coupling mechanism to turn or translate the rods but can also increase the precision of their actuation. In other embodiments of the invention, the first and second positioning actuators 110, 116 may include rods 126 that translate linearly without rotation to position an explosive device 62 or another object on the target base 50.

The stops 112 may include a flat surface that contacts and pushes an object positioned on the target base 50. The stops 112 may include a first rectangular or square plate 136 coupled to the first end 130 of the threaded rod 126 with the plate positioned perpendicular to the target base 50. However, the stops 112 may include alternative geometries (e.g. circular plates, etc.). Turning the handles 134 in one direction (e.g. clockwise) causes the stops 112 to move in a forward direction to contact and position an object on the target base 50. The stops 112 may also include a second rectangular plate 138 coupled to the upper edge of the first rectangular plate 136 and angled slightly away from the first rectangular plate 136. As an object 31 to be pressed is lowered into the press device 30, the second rectangular plates 138 guide the object toward the target base 50 in front of the first rectangular plates 136 to enhance the efficiency, efficacy and turnaround time of rendering safe explosives. The first rectangular plate 136 may be coupled to the threaded rod 126 via a swivel and may contact the target base 50 or another guide member coupled to the frame 36 to prevent the first and second rectangular plates 136, 138 from rotating.

Figure 2:
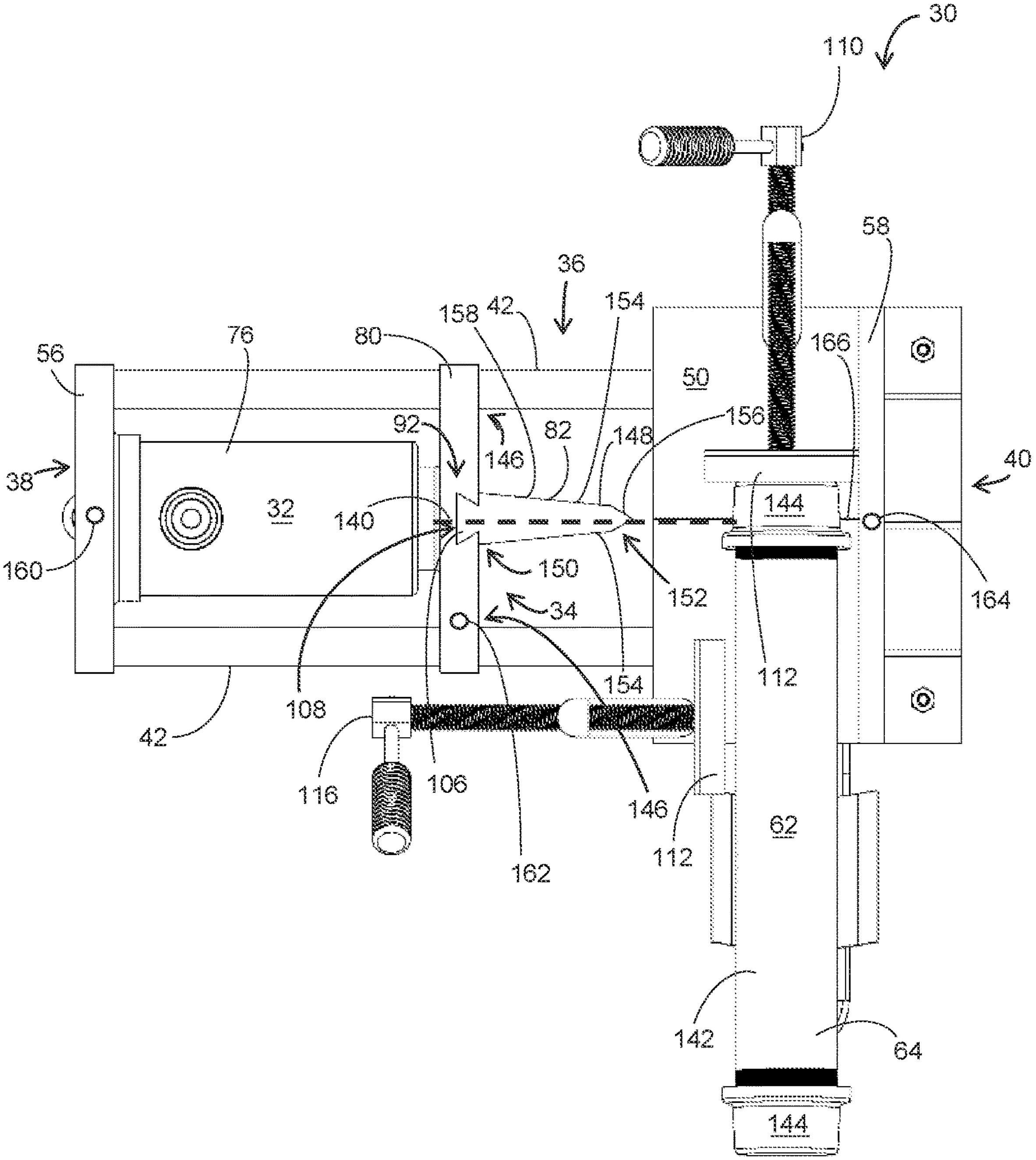
FIG. 2 is an upper view of the press device and explosive device of FIG. 1, according to one example.

Referring now to FIG. 2, an upper view of the press device 30 and explosive device 62 is shown, according to embodiments of the invention. FIG. 2 shows a bird's eye view of the target base 50 disposed over an upper portion of the frame 36 and the backplate 58 extending vertically from the frame 36 adjacent to the target base 50. The linear actuator 32 is shown mounted to the frame 36 and positioned to actuate along a translation axis 140 substantially parallel to the target base 50 and toward the backplate 58. The fracturing tool 82 is shown coupled to the linear actuator 32 to actuate along the translation axis 140 over the target base 50. The first positioning actuator 110 may be coupled to the frame 36 to actuate along the target base 50 in a direction substantially perpendicular to the translation axis 140, and the second positioning actuator 116 may be coupled to the frame 36 to actuate along the target base 50 toward the backplate 58.

According to embodiments of the invention, an explosive device 62 neutralized by the press device 30 may be an improvised explosive device (IED) or pipe bomb 64 having a tube 142 coupled to two endcaps 144. The explosive device 62 may have a length longer than its width with the length positioned transverse to the fracturing tool 82 so the fracturing tool 82 can fracture a weak portion of the explosive device. That is, the explosive device 62 may be placed on the target base 50 with the axis of the tube 142 perpendicular to the translation axis 140 of the fracturing tool assembly 34. The first positioning actuator 110 may actuate to contact an end cap 144 and move the explosive device 62 into a desired location relative to the fracturing tool assembly 34. In this example, a desired location for fracturing an explosive device 62 is along the tube 142 and adjacent one of the end caps 144. However, other objects may have different locations desirable for positioning on the target base when being rendered safe by the press device 30.

In embodiments of the invention, the frame 36 includes a plurality of guide rails 42 (also referred to as guide rods) extending parallel to the translation axis 140. The tool mount 80 may include a plurality of openings 146 formed therein to receive the plurality of guide rails 42 therethrough. Thus, the tool mount 80 may include two holes 146 that the pair of guide rails 42 pass through. As the stroke of the linear actuator 32 progresses, the tool mount 80 can slide along the guide rails 42. The fracturing tool 82 may include the tail 106 that is inserted into the dovetail slot 92 of the tool mount 80. As a result, the tool mount 80 may include the pair of openings 146 formed therein to receive the plurality of guide rails 42 such that the fracturing tool 82 is supported by the plurality of guide rails 42 when actuated by the linear actuator 32. The linear actuator 32 may be a double-acting hydraulic cylinder 76 capable of actuating the fracturing tool assembly 34 in opposing directions along the guide rails 42.

According to embodiments of the invention, the fracturing tool 82 includes a changeable wedge 148 removably coupled to the tool mount 80. In one example, the wedge 148 has a thick end 150 that tapers to a thin end 152 with the thick end coupled to the tool mount 80 and the thin end facing the backplate 58. In embodiments, the wedge 148 includes a triangular-shaped tool having two inclined surfaces 154 that meet at a sharp thin end 152. The two inclined surfaces 154 may be positioned vertically or perpendicularly to the target base 50 such that the thick end 150 and the thin end 152 are vertically oriented. The changeable wedge 148 and the tool mount 80 may include the respective first and second ends of a sliding dovetail joint 108 coupled together. FIG. 2 shows the tool mount 80 having a dovetail slot 92 and the wedge 148 having a mating tail 106 inserted into the slot. A slotted tool mount 80 allows for the various specialized wedge 148 geometries or other pressing tools to be dropped into the press device 30.

In embodiments of the invention, a wedge 148 with a particular geometry can be selected for use as the fracturing tool 82 to generate high forces required to cause mechanical failure of an explosive device 62 casing while maintaining durability of the wedge 148. The wedge 148 can generate a mechanical advantage (MA) factor which is the ratio of the wedge's length (L) to its width (W). The pressure generated by the wedge 148 against the object being fractured or ruptured can exceed the material compressive and tensile strengths of the object. In one example, a wedge 148 having a 1/32 inch thin end and a 3 inch wide end uses a 10,000 pound hydraulic cylinder 76 to apply the load (F) producing sufficient pressure to split an IED. After the wedge 148 notches into an explosive device 62, the load (F) applied on the wedge 148 is amplified to produce a reaction force (Fr) normal to the wedge 148 that is equal to the load (F) multiplied by the mechanical advantage (MA) of the wedge 148 (ignoring friction). The area of the explosive device 62 at the wedge 148 is under tensile stress and a load (F) from the hydraulic cylinder 76 can be amplified by the wedge 148 to exceed the tensile strength of the explosive device 62 causing its casing to fail. According to embodiments of the invention and not limited thereto, a wedge 148 mechanical advantage (MA) factor could range from 4 to 10 times (e.g. 5, 6, 7, 8, or 9 times, etc.) of the force applied on the wedge 148, and thus a 20-ton hydraulic cylinder could create a reaction force up to 400,000 pounds to split the explosive device 62. In embodiments of the invention, a predetermined MA could be provided by a wedge 148 with an apex angle of 5, 10, 15, 20, 25 or 30 degrees.

FIG. 2 shows the fracturing tool 82 including a compound wedge 148. The compound wedge 148 has a multi-tiered taper, thereby creating a first taper 156 and a sharper second taper 158. The first taper 156 forms a linear tip of the wedge 148 and the second taper 158 extends from the first taper 156 to the back end of the wedge 148. The first taper 156 increases the toughness of the wedge 148 geometry, i.e. at the tip. Thus, by combining the first and second tapers 156, 158, the overall strength of the wedge 148 is increased to prevent it from failing and breaking. The tool mount 80, also referred to as a wedge mount, may include a standardized slot such as the dovetail slot 92 shown in FIG. 2 to facilitate the rapid changing of specialized wedges 148. The back end of the wedge 148 is shown with the tail 106 of the dovetail connection 108. Gravity can hold the wedge 148 into position within the tool mount slot 92 without requiring an additional locking mechanism to secure the wedge 148 in the tool mount 80.

Most IEDs in the United States are pipe bombs 64 which can be constructed in many forms. Capped pipe bombs 64 are often made from mild steel pipe nipples 142 with cast iron endcaps 144 threaded on each end of the nipple, but are also commonly made from Schedule 40 PVC pipe. Pipe bombs also commonly include internally plugged pipe fittings such as elbows constructed from Schedule 40 cast iron with plugs inserted into the ends of the elbows. Cast iron and PVC can be brittle materials for bomb casings having a low fracture toughness and thus a crack formed by the wedge 148 readily propagates through the bomb 64. Cast iron or PVC pipe bombs often fall apart when a wedge 148 penetrates approximately halfway through the wall of the pipe such that further penetration is not required to neutralize the pipe bomb 64. In such situations, the wedge 148 may neutralize a pipe bomb 64 without directly compressing the explosive material in the pipe bomb 64 or without producing significant frictional heating resulting in a low risk of insulting even highly sensitive explosive material inside the bomb 64.

In embodiments of the invention, when the press device 30 is actuated, the wedge 148 will make contact with a target location on the explosive device 62 and the backplate 58 will act as a counterforce to constrain the movement of the explosive device 62. As the wedge 148 progresses forward, the pressure grows until the wedge edge 152 begins to cut into the sidewall of the explosive device 62. The wedge 148 reaction force splits open the explosive device 62. Hydraulic, pneumatic, and gear-driven electric actuating systems can generate and apply a very high force on the wedge 148. For pipe bombs 64 constructed from steel pipe fittings, a linear actuator 32 should be able to produce a minimum of 40,000 pounds to neutralize the explosive device 62 with the press device 30, according to embodiments of the invention.

A camera system (not shown in FIG. 2) can be removably mounted to the press device 30 to aid in local or remote placement of an explosive device 62 on the target base 50 and to aid in operating the press device 30. Some preferred mounting locations for cameras include a first location 160 on the endplate 56, a second location 162 on the tool mount 80, and a third location 164 on the backplate 58. FIG. 2 shows the first and third locations 160, 164 aligned in a plane extending vertically through the translation axis 140 while the second location 162 is positioned offset from the plane toward the second positioning actuator 116. Accordingly, two cameras may be mounted in alignment with the fracturing tool assembly 34 and one camera may be mounted on the tool mount 80 adjacent the sliding dovetail joint 108. The mounting locations may include a connection or fastening mechanism as would be understood by one of ordinary skill in the art to secure the camera to the press device 30. The preferred mounting locations allow upper views of the press device 30 from the first end 38 and the second end 40 of the frame 36 along with a view onboard the fracturing tool assembly 34.

When placing an explosive device 62 on the target base 50 using a remotely controlled robot, the operator can use the camera system of the press device 30 or a camera system onboard the robot to orient the explosive device 62. Robots used during explosive device neutralization procedures generally have two-dimensional vision and cameras on the press device 30 can aid in seeing in the third dimension. The operator can lower an arm of the robot having a gripper holding the explosive device 62 and then release it from the gripper onto the target base 50. The stops 112 can guide the explosive device 62 into an optimal location relative to the fracturing tool 82. The target base 50 may include a narrow scored line 166 aligned with the translation axis 140 to provide a visual guide for positioning the explosive device 62 with the positioning actuators 110, 116. FIG. 2 shows an endcap 144 of an explosive device 62 centered on the scored line 166 to be fractured by the edge of the wedge 148.

Figure 3:
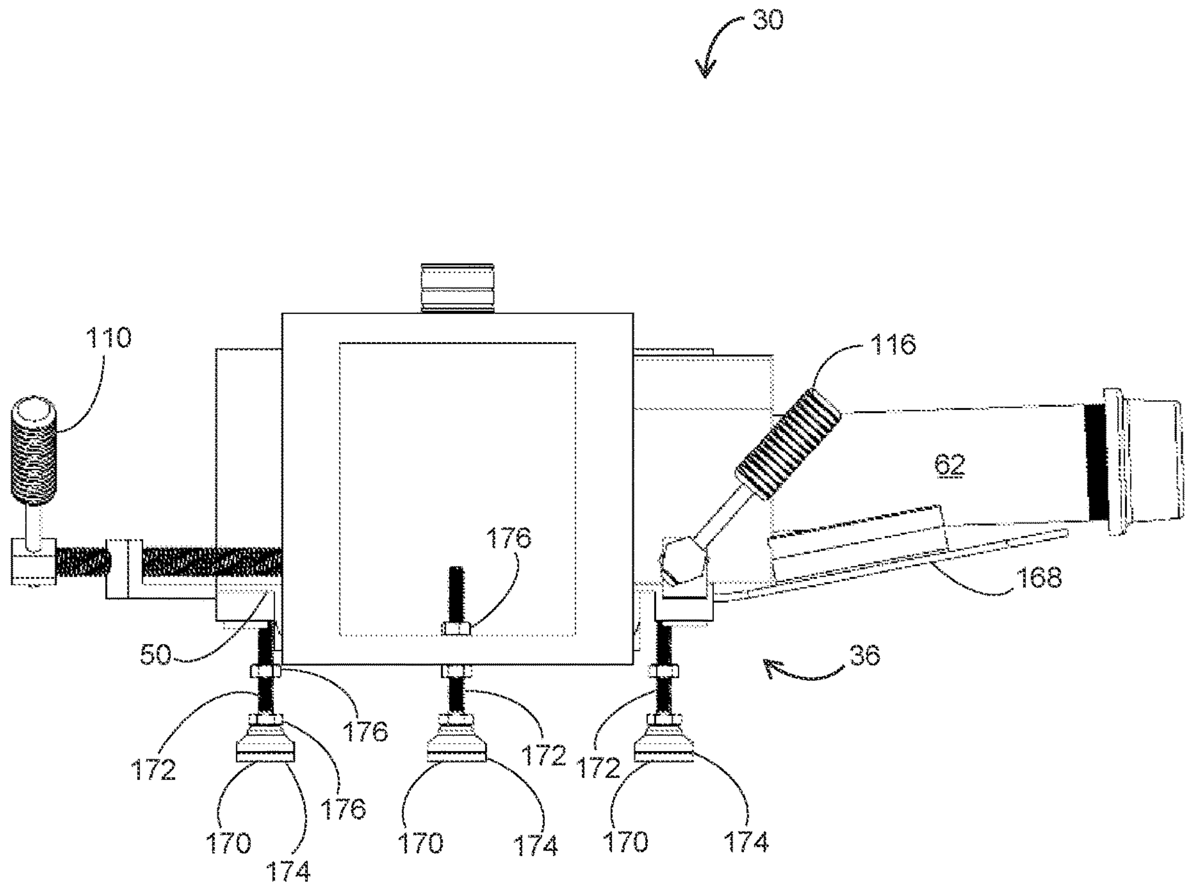
FIG. 3 is a front view of the press device and explosive device of FIG. 1, according to one example.
Figure 4:
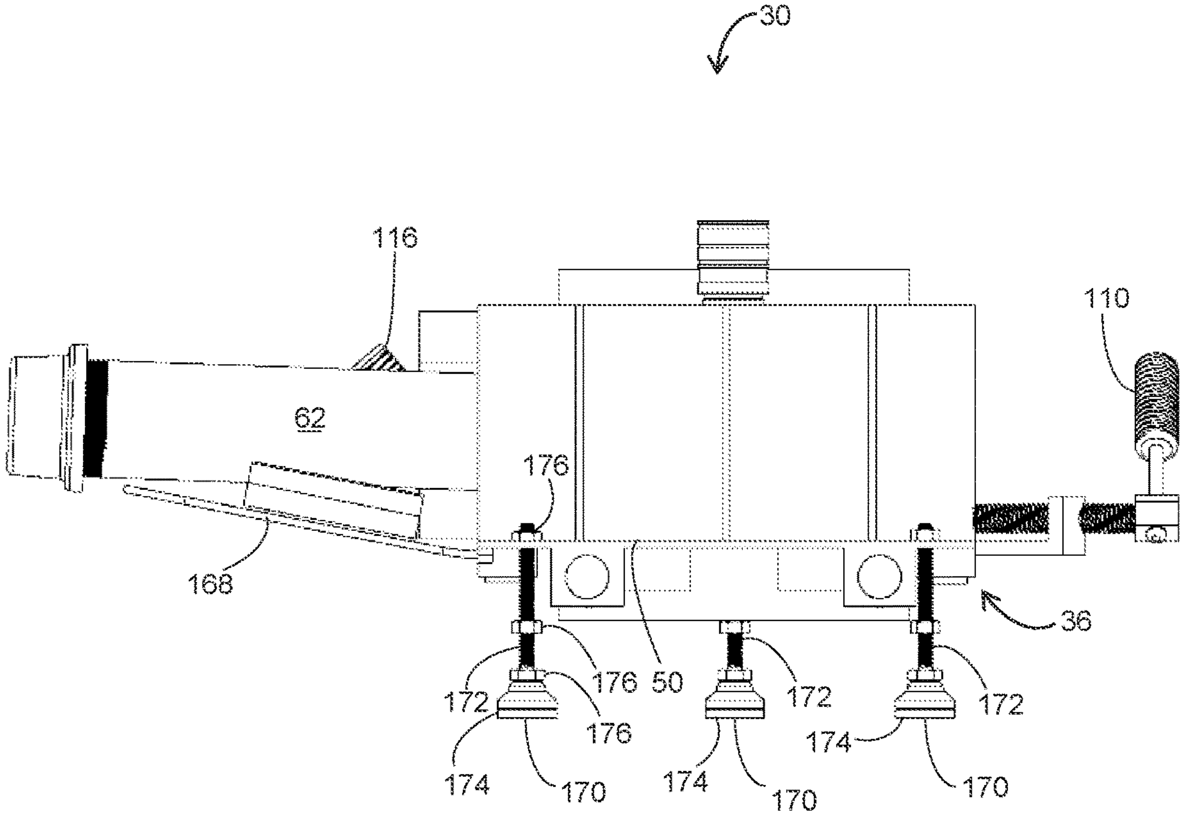
FIG. 4 is a back view of the press device and explosive device of FIG. 1, according to one example.

FIG. 3 is a front view of the press device 30 with the explosive device 62 while FIG. 4 is a back view of the press device 30 with the explosive device 62, according to an embodiment of the invention. The press device 30 may include a detachable base extension 168 to aid in holding the explosive device 62 on the target base 50. The detachable base extension 168 may be a lightweight wire-framed inclined tray or platform that supports one end of the explosive device 62 that may extend beyond the target base 50. The detachable base extension 168 may couple to the frame 36 to support an end of the object opposite the first positioning actuator 110 and adjacent to the second positioning actuator 116. The detachable base extension 168 may be an extendable tray holder that adjusts to accommodate a wide range of explosive device 62 lengths to be neutralized in the press device 30.

According to embodiments of the invention, the target base 50 is substantially horizontal and includes a plurality of adjustable leveler feet 170 extending downward from the frame 36. The press device 30 is shown with three adjustable leveler feet 170 coupled to the bottom surface of the frame 36 to level the target base 50. The leveler feet 170 may each include a screw or threaded rod 172 with an upper end coupled to the frame 36 and a lower end coupled to a foot 174. A plurality of nuts 176 may be threaded on the threaded rod 172 to hold the rod to the frame 36 and to the feet 174. The threaded rod 172 may extend into an opening in the feet 174, with the opening being threaded or a nut 176 being mounted above the hole to mate with the rod. Turning the feet 174 may cause the feet to translate along the threaded rod 172 and thereby adjust the length of the leveler feet. Alternatively, the feet 174 may be rigidly connected to the threaded rod 172 such that turning the feet 174 adjusts the length of the rod extending downward from the frame 36.

Figure 5:
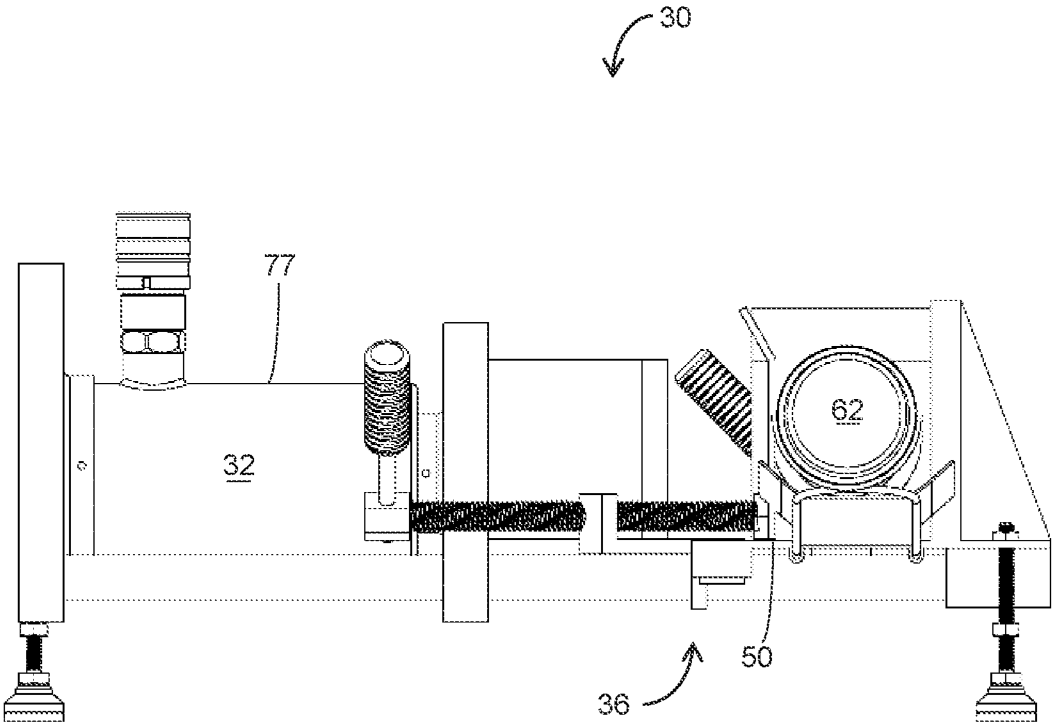
FIG. 5 is a side view of the press device and explosive device of FIG. 1, according to one example.

FIG. 5 is a side view of the press device 30 and explosive device 62, according to an embodiment of the invention. A horizontal profile of the press device 30 provides a low center of gravity which improves stability during use. FIG. 5 shows the linear actuator 32 comprising a pneumatic cylinder 77 in a horizontal orientation. The low center of gravity also reduces the profile size and footprint required to maintain stability, thereby reducing the material and weight requirements of the press device 30. In contrast, some vertically oriented press systems would tip over without additional stabilizers such as outriggers, sandbags, or braces. The RAVEN 30 can have a significantly smaller base profile and does not need outriggers, stanchions, or support platforms. A low center of gravity, light weight, and small footprint allows the press device 30 to be deployed in urban environments or inside tight spaces such as hallways, bathrooms, stairwells, etc. In addition, a small footprint allows the press device 30 to be easily stored in vehicles used to transport the press device 30.

As referred to previously, the press device 30 may be operated in a generally horizontal orientation (e.g. the linear actuator 32 actuates in a generally horizontal orientation) such that the press device 30 has an open configuration above the target base 50. The open configuration of the frame 36 above the target base 50 allows a bird's eye view of the target base 50 for ease of placing an explosive device 62 thereon without physical obstructions over the target base 50. Accordingly, a small robot can use mast and arm cameras to provide an unobstructed view of the target base 50 while the explosive device 62 is positioned in the press device 30 by the robotic arm. In contrast, the frame on some press systems can obstruct vision and access from a robot used to place the bomb on a target platform.

A bomb technician or a robot may carry the press device 30 to a location where an explosive device neutralization procedure will be executed. In one example, a press device 30 with a steel frame and a hydraulic actuator may have a weight of less than or approximately 50 pounds. Therefore, a single bomb technician in a bomb suit may be able to lift and carry the press device 30 to an area where an explosive device 62 is to be neutralized. Alternatively, a small or medium-sized robot typically used for neutralizing explosive devices 62 could transport the press device 30 to the area where the explosive device 62 is to be neutralized. Alternatively, a bomb technician could place the press device 30 on a cart, or the press device 30 may include wheels and carrying handles, for transportation by a single technician.

Figure 6:
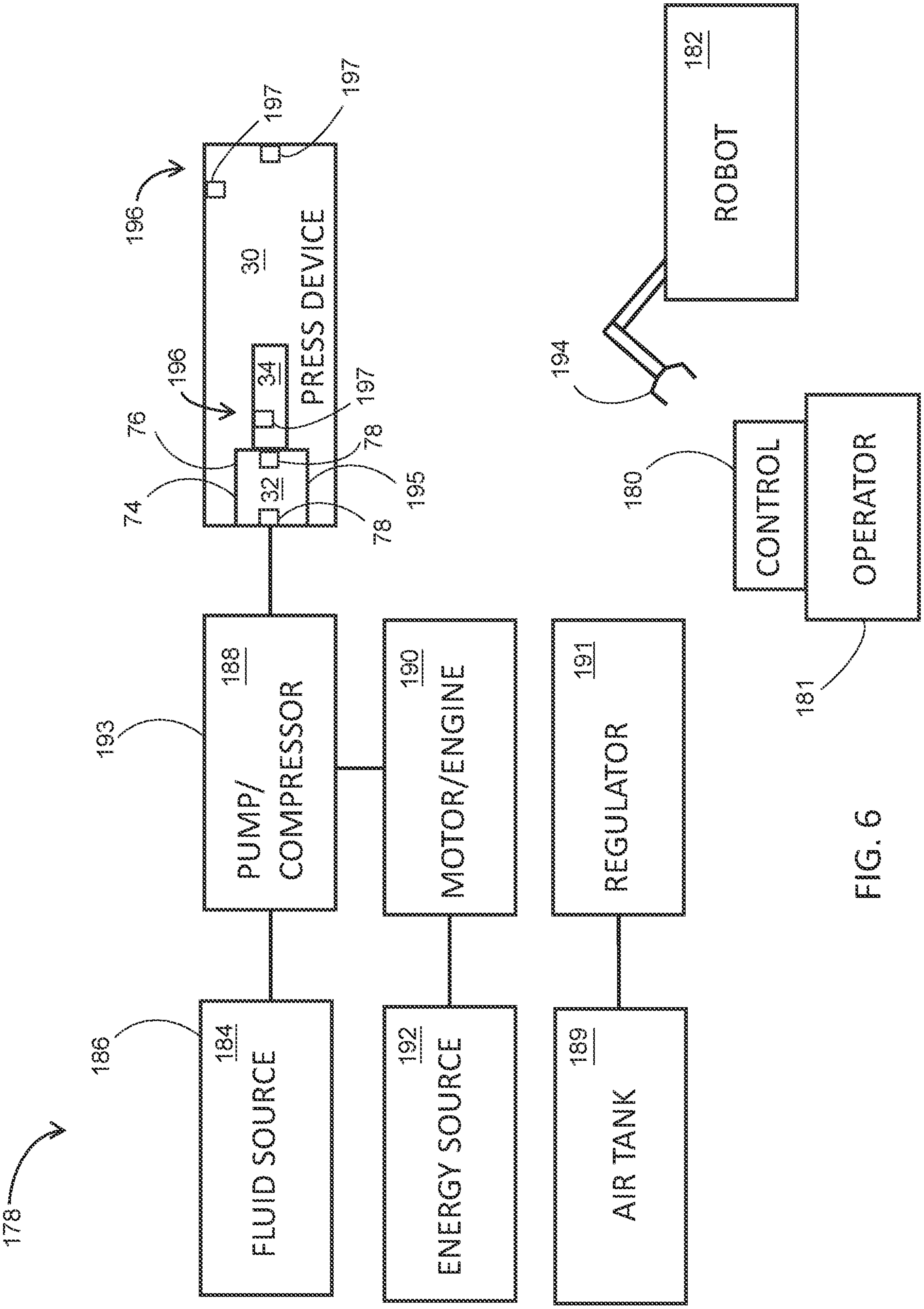
FIG. 6 is a block diagram of a system to neutralize an explosive device using the press device of FIG. 1, according to one example.

FIG. 6 is a block diagram of a system to neutralize an explosive device using the press device 30, according to an embodiment of the invention. Remote placement and operation of the press device 30 by a robotic device 182 provides important safety measures for handling many types of hazardous devices. The press device 30 may couple to a power unit 178 to power and control the linear actuator 32. The power unit 178 may be placed a distance from the press device 30 (e.g. 100-300 feet) so that there is reduced risk of damage if the explosive device explodes. A remote control 180 may be configured to operate the power unit 178 and the robot 182. The remote control 180 may operate at a distance farther from the press device 30 than the power unit 178 (e.g. 300-1000 feet) and/or be operated by a bomb technician under cover or in a bomb shelter. The remote control 180 may be powered by batteries or another direct current (DC) power source. After the explosive device is placed on the press device 30 by the robot 182, the robot can be moved to a safe distance from the press device 30 such that the robot will not be damaged if the explosive device explodes.

According to embodiments of the invention, the linear actuator 32 comprises a fluid pressure actuator 74 coupled to a source of pressurized fluid 184 provided by the power unit 178. The fluid pressure actuator 74 may include a hydraulic cylinder 76. Thus, the power unit 178 may include a liquid reservoir 186, a pump 188 operably coupled to the liquid reservoir 186 and the hydraulic cylinder 76, a prime mover 190 driving the pump 188 to pressurize liquid from the liquid reservoir 186 and provide the pressurized liquid selectively to the hydraulic cylinder 76, and an energy source 192 configured to power the prime mover 190. The hydraulic cylinder 76 may be a double-acting cylinder with a pair of hose couplings 78 to attach the power unit 178 to separate chambers of the cylinder. According to embodiments of the invention, the prime mover 190 may comprise an electric motor or an internal combustion engine. The energy source 192 may comprise a source of combustible fuel (e.g. gasoline, diesel, propane, natural gas, etc.) a source of electrical energy (a 12V or 24V battery, a 110-120V alternating current (AC) electrical outlet, etc.). According to embodiments of the invention, a pump 188 used to drive the linear actuator 32 may include a 12V DC hydraulic pump and a 12V DC battery could be used to power the 12V DC hydraulic pump 188 (i.e. a car or motorcycle battery, etc.). In other embodiments, the linear actuator 32 is a 12V hydraulic power unit with an integrated double-acting hydraulic pump, motor, and fluid reservoir available from VEVOR® (Rancho Cucamonga, California).

According to embodiments of the invention, the pump 188 may comprise a common commercial off-the-shelf air-powered pump powered by a source of compressed air as the prime mover. The air-powered pump can be powered using tanks of compressed air or an air compressor. For example, compressed air bottle(s) 189 or self-contained breathing apparatus (SCBA) tank(s) with regulators 191, or a pancake compressor could provide air pressure to run the air-powered pump. Air bottles are often readily accessible to first responders and bomb technicians. The air compressor could be gas-powered or electric-powered.

According to embodiments of the invention, the fluid pressure actuator 74 may include a pneumatic cylinder. Thus, the power unit 178 may include a compressor 193 operably coupled to the pneumatic cylinder with the prime mover 190 driving the compressor to provide pressurized gas selectively to the pneumatic cylinder. Alternatively, the pneumatic cylinder could be powered by tanks of compressed air 189 with regulators 191 configured to control pressurized air provided to the pneumatic cylinder.

According to embodiments of the invention, the linear actuator 32 may include an electric linear actuator 195. The electric linear actuator 195 may include an electric motor and a gear system driven by the electric motor to actuate the fracturing tool assembly 34. An electric linear actuator could provide a linear actuator 32 that is compact and lightweight. The electric linear actuator could be computer controlled and include force sensors or other feedback systems that could reduce overtravel. The electric linear actuator 195 may be programmed to provide a tiered progression of actuating steps that vary stroke lengths, but also to specify applied force(s), rate of stroke, and duration of steps, etc.

The press device 30 may be operated as a quasistatic mechanical tool that neutralizes an explosive device by slowly applying a high force to the explosive device. Thus, the press device 30 may be actuated in a slow and controlled manner to reduce the power delivered by the fracturing tool assembly 34 to the explosive device, thereby allowing for heat produced due to compression, shear stress, and friction to dissipate. Quasistatic tools can produce little or no shock in comparison to explosive device neutralization methods that rely on projectiles to produce high-velocity impact. As a result, the press device 30 can neutralize an explosive device with a reduced likelihood of igniting the explosive device. For example, after a wedge 148 (FIG. 2) initially perforates an explosive device casing, pausing the linear actuator 32 and sustaining the applied force may result in a crack growing over time until a portion of the explosive device casing under stress from the wedge 148 falls apart. Quasistatic neutralization methods using a wedge 148 (FIG. 2) can be particularly beneficial for preventing ignitions while neutralizing steel and plastic-capped pipe bombs, steel and plastic-plugged pipe bombs, and improvised grenades containing black powder, smokeless powder, or flash powder.

Figure 7:
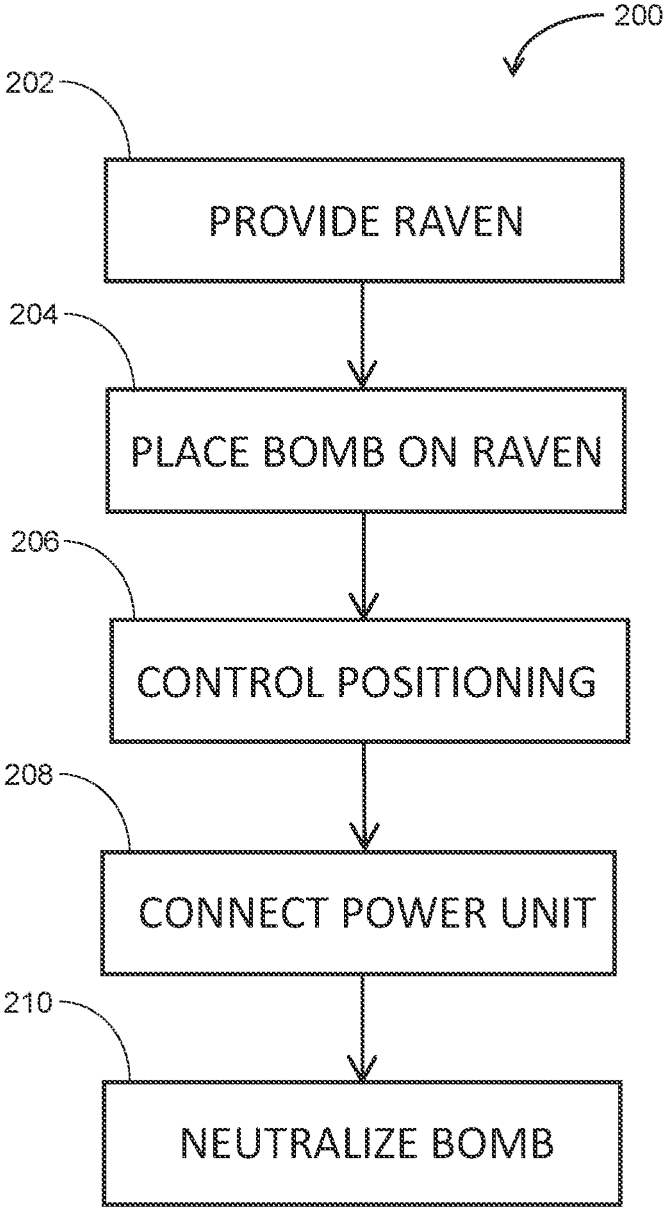
FIG. 7 is a flow chart illustrating a technique of neutralizing an explosive device using the press device of FIG. 1, according to one example.

Referring now to FIG. 7, with continued reference back to FIGS. 2 and 6, a flow diagram of a process 200 for operating a remotely actuated versatile explosives neutralizer (RAVEN) is illustrated, according to embodiments of the invention. The process 200 begins at STEP 202 by providing a RAVEN 30 to neutralize an explosive device 62. The RAVEN 30 may include a main body 36 having an upper surface to receive an explosive device 62 thereon, and a backplate 58 extending upward from the main body. A fracturing tool 82 may be linearly translatable over the upper surface of the main body 36 along a translation axis 140 toward the backplate 58 to fracture an explosive device 62 on the upper surface. The RAVEN 30 may further include a tool mount 80 coupled to the linear actuator 32, and the fracturing tool 82 may comprise a changeable wedge 148 removably connected to the tool mount 80. The linear actuator 32 may couple to the main body 36 to induce linear translation of the fracturing tool 82 along the translation axis 140. A first positioning actuator 110 may be coupled to the main body to induce linear translation of the explosive device 62 across the translation axis 140 and align the explosive device 62 with the fracturing tool 82.

The process 200 continues at STEP 204 by transporting the RAVEN 30 to a location where an explosive device is to be neutralized and placing the explosive device 62 on the RAVEN 30. The RAVEN 30 may be lifted and transported to a desired location for fracturing the explosive device 62 via a remote-controlled robot 182 or manually. The RAVEN 30 can be placed on the ground by a remote-controlled robot 182 or an operator 181 and leveled using adjustable leveler feet 170 (FIG. 4). The explosive device 62 is placed on the upper surface of the main body 36 between the fracturing tool 82 and the backplate 58. The explosive device 62 may be an improvised explosive device (IED) or military ordnance. Placing the explosive device 62 on the upper surface of the main body 36 may include operating the remotely controlled robot 182 to lift and transfer the explosive device 62 to the upper surface of the main body 36. The robot 182 could be controlled to pick up an explosive device 62 with a robot gripper 194 and rest the explosive device 62 on the target base 50, and the robot may include a camera system to aid a person remotely operating the robot.

The process 200 continues at STEP 206 by positioning the explosive device 62 on the target base 50 of the main body 36 using one or more positioning actuators 110, 116. The RAVEN 30 may include a first positioning actuator 110 coupled to the main body 36 and configured to induce linear translation of the explosive device 62 across the translation axis 140. The first positioning actuator 110 may be controlled to move the explosive device 62 into a desired position aligned with the fracturing tool 82. The RAVEN 30 may include a second positioning actuator 116 coupled to the main body 36 and configured to actuate in a direction substantially parallel to the translation axis 140. The second positioning actuator 116 may be controlled to secure the explosive device 62 against the backplate 58. The first and second positioning actuators 110, 116 may actuate linearly over the target base 50 to push the explosive device 62 into a desired position. The first and second positioning actuators 110, 116 may include a handle to operate the actuators manually or via a robot 182, but the positioning actuators could be motorized and remotely controlled. To aid in positioning the explosive device 62, STEP 206 may include viewing images from a camera system 196 having cameras 197 mounted on the main body 36, backplate 58, and/or tool mount 80 to determine the position of the explosive device 62 when controlling the first and second positioning actuators 110, 116.

The process 200 continues at STEP 208 by connecting a power unit 178 operably to the linear actuator 32 to selectively induce linear translation of the fracturing tool 82. The linear actuator 32 may comprise a hydraulic cylinder 76, a pneumatic cylinder, or a motorized actuator. In various embodiments, the power unit 178 includes a liquid reservoir 186, a pump 188 operably coupled to the liquid reservoir and to the hydraulic cylinder 76, and a prime mover 190 driving the pump 188 to pressurize liquid from the liquid reservoir and provide the pressurized liquid selectively to the hydraulic cylinder 76. In alternative embodiments, the power unit 178 may include a compressor operably coupled to a pneumatic cylinder with the prime mover 190 driving the compressor to provide pressurized gas selectively to the pneumatic cylinder. In yet alternative embodiments, the power unit 178 may include an electric linear actuator with an electric motor and a gear system driven by the electric motor to actuate the electric linear actuator. A remote control 180 may be configured to operate the power unit 178. The process 200 concludes at STEP 210 by operating the power unit 178 to fracture the explosive device 62 with the fracturing tool 82. Operating the power unit 178 to fracture the explosive device 62 with the fracturing tool 82 may comprise operating the power unit 178 via the remote control 180. In various embodiments, the robot 182 can actuate the press device 30 using the gripper 194 to operate the linear actuator 32 or the press device 30 may be directly controlled by a press plate controller unit located a safe distance away or behind cover.

Figure 8:
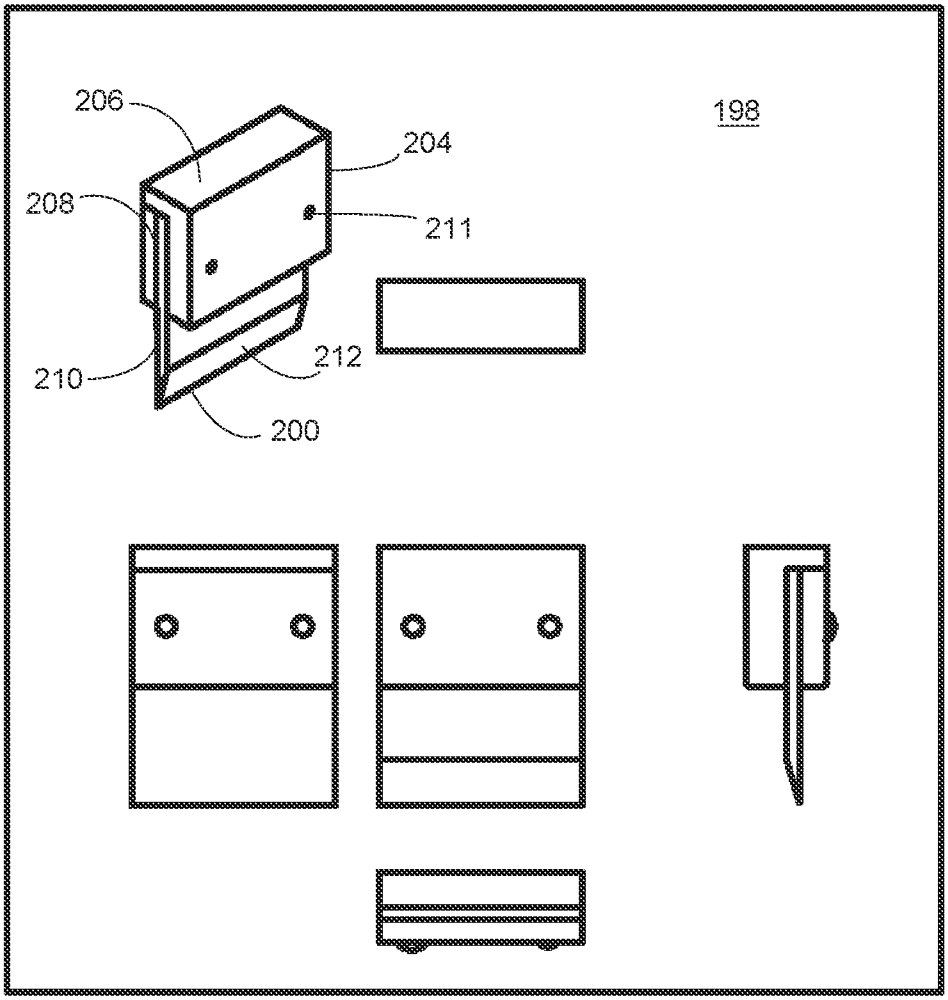
FIG. 8 is a bladed fracturing tool having a linear tip for use with a press device, according to one example.
Figure 9:
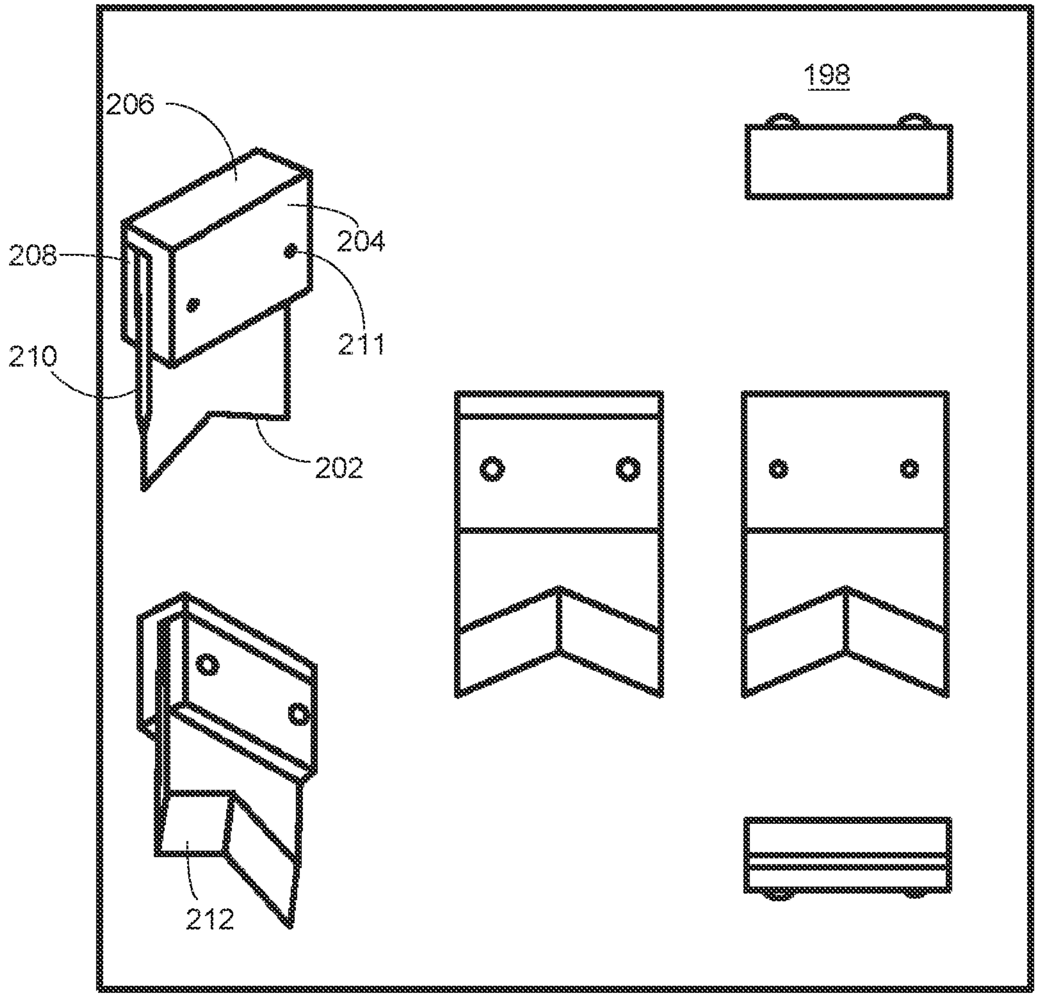
FIG. 9 is a bladed fracturing tool having a non-linear tip for use with a press device, according to one example.

Referring now to FIGS. 8 and 9, a bladed fracturing tool 198 for use with the press device 30 (FIG. 2) is shown, according to an embodiment of the invention. The bladed fracturing tool 198 can have a linear tip 200, as shown in FIG. 8, or a non-linear tip 202 as shown in FIG. 9. The bladed fracturing tool 198 has a symmetrical body 204 comprised of a back end 206 that connects to the tool mount 80 (FIG. 2) (e.g. via a fastener, welding, dovetail connection, etc.) and a cavity 208 is formed along an interior length of the body 204 to receive the blade 210. The blade 210 can be affixed to the body 204 via a fastener 211, a screw, a bolt, or it could be welded to the body. The blade 210 can be straight or have a tapered portion 212. Fracturing devices having a blade 210 can be preferred for fracturing explosive device casings constructed from highly ductile or soft materials, such as copper, flexible plastic, or cardboard tubing. In contrast to a bladed tool, a soft explosive device casing can significantly crimp when attempting to fracture the casing with some wedge geometries. This crimped portion could obstruct the flow of explosive material from the casing and prevent visual confirmation that the explosive device has been disarmed. Accordingly, for certain explosive devices, the use of the blade 210 geometry overcomes these obstacles by creating a slicing or cutting action as the blade 210 progresses through the explosive device. Further, the non-linear tip 202 of FIG. 9 helps to secure oddly shaped explosive devices and also results in a slicing action, thereby improving the effectiveness of fracturing the explosive device while reducing the risk of activating the explosive device. The blades 210 of FIGS. 8 and 9 illustrate the use of a single beveled edge, which can increase mechanical advantage.

Figure 10:
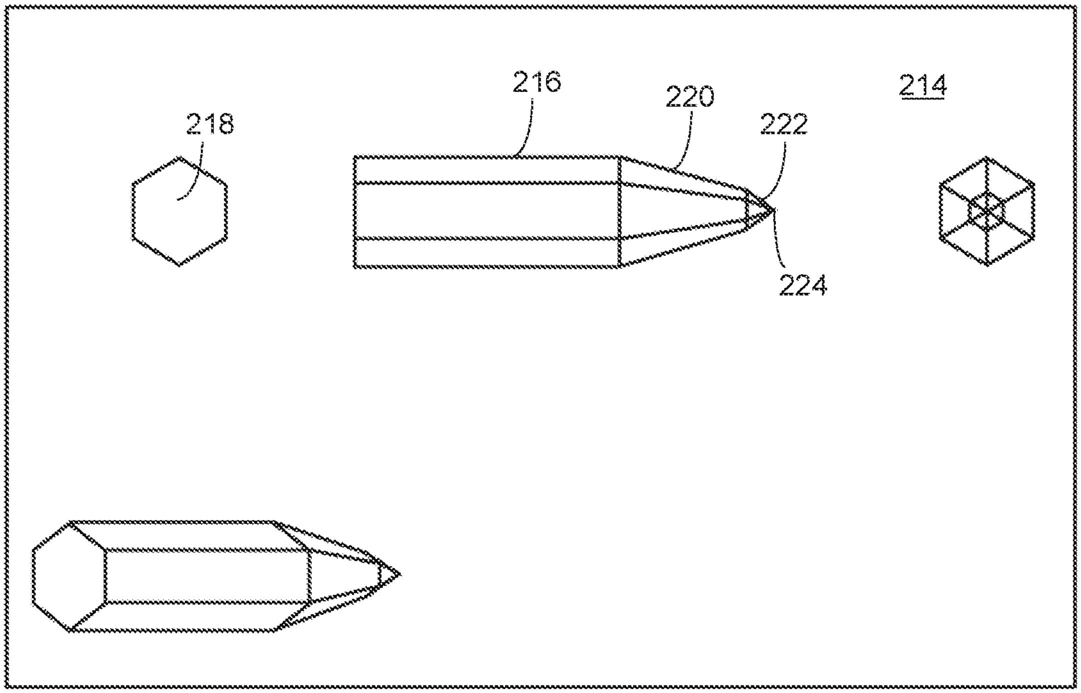
FIG. 10 is a punch tool for use with a press device, according to one example.

Referring now to FIG. 10, a punch tool 214 for use with the press device 30 (FIG. 2) is shown, according to an embodiment of the invention. The punch tool 214 has a hexagonal shape and elongated body 216 extending from a back surface 218 that can secure to the tool mount 80 (FIG. 2) (e.g. via a fastener, welding, dovetail connection, etc.). The punch tool 214 includes a first taper 220 which terminates at a second taper 222 which terminates at a tip 224. The second taper 222 is configured to apply a high force at the tip 224, thereby enhancing the ability to effectively fracture an object by puncturing it upon contact. Some IEDs or other explosive device containers may contain liquids, fine explosive filler, or other chemicals that react to produce gases that pressurize the explosive device container. The punch tool 214 can rupture the explosive device casing and provide a hole for the liquid, filler, and/or pressurized vapor to leak out of the explosive device. In the case of pressurized vessels such as propane tanks or acid bombs, the punch tool 214 can puncture the side of the container to relieve the pressure and allow flammable or compressed gases to escape.

Figure 11:
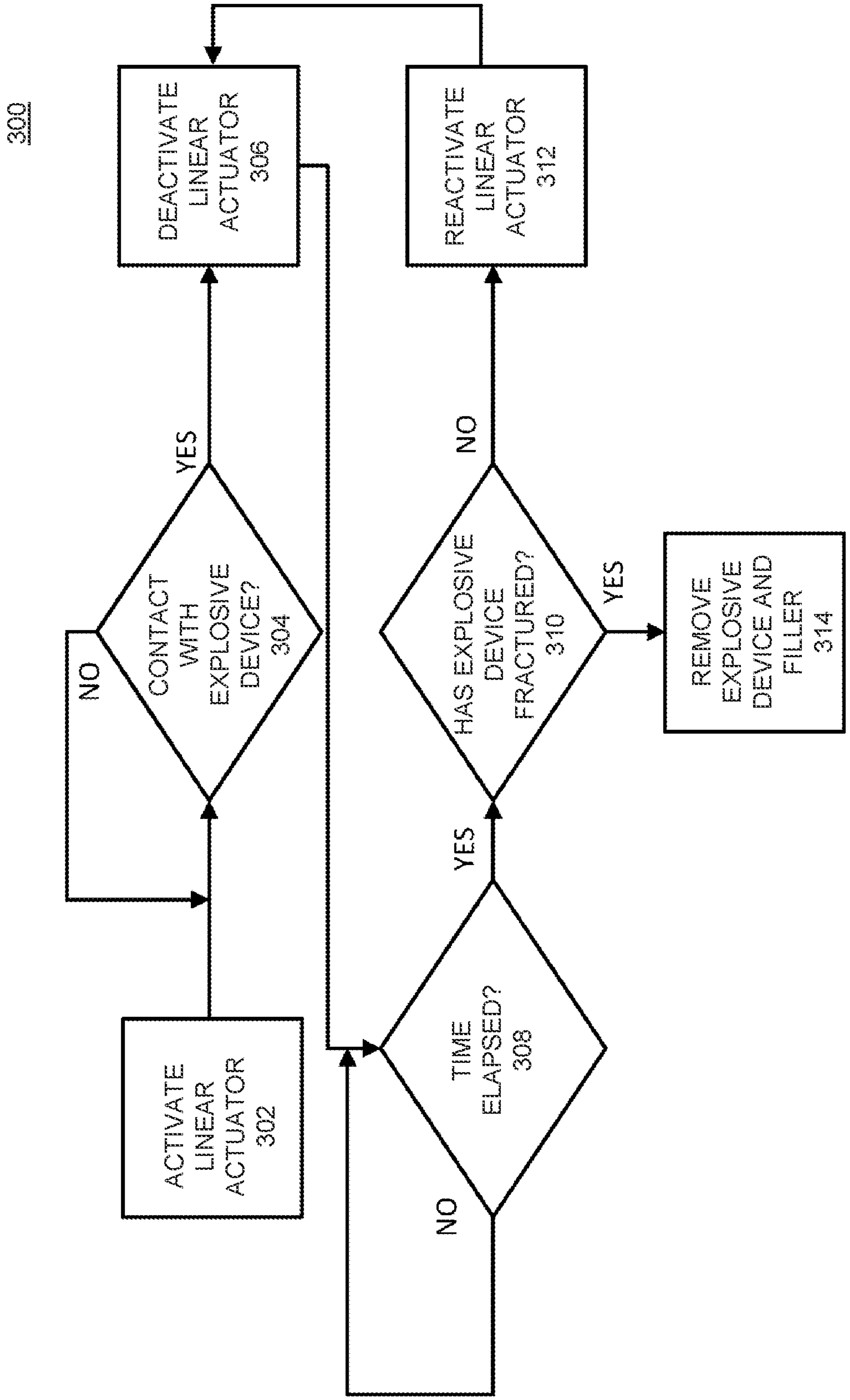
FIG. 11 is a flow chart illustrating a technique of neutralizing an explosive device by controlling pressure applied to the explosive device by the press device of FIG. 1, according to one example.

Referring now to FIG. 11, with continued reference back to FIGS. 2 and 6, a flow diagram of a process 300 for neutralizing an explosive device 62 by controlling pressure applied to the explosive device 62 by the press device 30 is shown, according to embodiments of the invention. Activation by the remote control 180 at step 302 causes the linear actuator 32 to displace the fracturing tool assembly 34 linearly along the translation axis 140 toward the explosive device 62 positioned on the target base 50. Activation is maintained via the remote control 180 until the fracturing tool assembly 34 contacts the explosive device 62. According to embodiments of the invention, the fracturing tool assembly 34 is stopped upon contacting the explosive device 62, as excessive force could push through the explosive device 62 casing to the explosive filler and result in detonation of the explosive device 62. Accordingly, in certain exemplary methods, care is taken to determine when contact between the fracturing tool assembly 34 and the explosive device 62 takes place at step 304. There are various ways contemplated herein to determine whether there is contact between the fracturing tool assembly 34 and the explosive device 62. One approach to identifying such contact is to analyze feedback (e.g. audio, visual, or vibrational feedback, etc.) from the power unit 178 indicating that the burden of moving the fracturing tool assembly 34 has increased, thus requiring more energy. The feedback may be obtained from one or more sensors on the press device 30 or the robot 182.

If it is determined at step 304 that the fracturing tool assembly 34 has not yet contacted the explosive device 62, activation of the press device 30 is maintained until it is determined that contact has occurred. However, if it is determined at step 304 that there is contact between fracturing tool assembly 34 and the explosive device 62, or if feedback indicates that the fracturing tool assembly 34 is at a fracture position, the press device 30 is deactivated at step 306 via the remote control 180 while pressure is maintained on the explosive device 62 via the fracturing tool assembly 34. For example, according to embodiments of the invention one or more sensors (not shown) incorporated into the press device 30 or the robot 182 provide digital feedback to the remote control 180 which, upon detecting audio feedback and/or vibrational feedback above a certain threshold, would deactivate the power unit 178, thereby pausing motion of the fracturing tool assembly 34.

Once the press device 30 is deactivated at step 306, contact between the fracturing tool assembly 34 and the explosive device 62 is maintained for a predetermined period of time at step 308. According to embodiments of the invention, the period of time is one to two minutes. However, the time can vary based on the type of explosive device 62 and the type of explosive filler without departing from the scope of the present subject matter.

Once the predetermined period of time has elapsed at step 308 it is determined whether the explosive device 62 has fractured at step 310. The time period can be monitored manually or via a timer (not shown) included in the press device 30. In embodiments of the invention, the timer provides an audio and/or visual indication when the time period has elapsed. Fracture can be determined by observing breakage of the explosive device 62 resulting in the explosive filler being exposed. If it is determined at step 310 that the explosive device 62 has sufficiently fractured, the explosive device 62 and explosive filler are removed at step 314 and the explosive device 62 is considered rendered safe. If it is determined at step 310 that the explosive device 62 has not sufficiently fractured, the press device 30 is temporarily reactivated at step 312 via the remote control 180 to apply additional force to the explosive device 62 via fracturing tool assembly 34 before again deactivating to maintain the force on the explosive device 62. Thus, in this instance, the period of time is reset to zero and steps 306 and 310 are repeated. If the time period again elapses without fracture, step 312 is repeated by reactivating the press device 30 and repeating the process. This process is repeated until it is determined that the explosive device 62 has fractured at step 310, at which point the explosive filler is removed at step 314.

Step 312 may in one example entail executing a sequence of stroke steps of equal or differing length with pauses of time (step 308) between movements. Step 312 may optionally in one example constitute applying a constant force, or ramping the force at a specified rate. In embodiments of the invention, the rate of application of the fracturing tool assembly 34 is adjusted based on the type of explosive device 62 and/or explosive filler. For example, for cardboard based IEDs and more ductile IEDs, the rate at which pressure is applied to the IED via fracturing tool assembly 34 may be lower as compared to steel IEDs to reduce the risk of crimping. Further, the rate may be inhibited to lower levels when the IED contains flash powder to lower the risk of puncturing the IED and detonating the flash powder. Faster rates may be utilized for harder IEDs, such as steel, which contain less reactive explosive filler.

Beneficially, embodiments of the invention provide a remotely actuated press device that can rupture and neutralize explosive devices. The press device includes a linear actuator that can be remotely controlled to press a fracturing tool against an explosive device. The fracturing tool may be removably connected to the linear actuator so that different tools can be swapped out for a particular application. The linear actuator may be positioned in a horizontal or recumbent position which allows the press device to have a compact design and a low center of gravity. An open configuration above the target base allows a robot to easily lower an explosive device onto the press device. The press device may incorporate common or off-the-shelf materials and is less expensive to construct than existing remotely actuated explosive neutralizing devices. A single person may be able to carry the press device to a location where an explosive device will be neutralized and the press device may be remotely controlled. Positioning actuators can move the explosive device to a desired location relative to the fracturing tool.

Therefore, according to one embodiment of the invention, a press device includes a frame comprising a target base disposed over an upper portion thereof, a back support extending vertically from the frame adjacent to the target base, and a linear actuator mounted to the frame and positioned to actuate along a translation axis substantially parallel to the target base and toward the back support. The press device may also include a fracturing tool coupled to the linear actuator to actuate along the translation axis over the target base, and a first positioning actuator coupled to the frame to actuate along the target base in a direction substantially perpendicular to the translation axis.

According to another embodiment of the invention, a press device for fracturing an object includes a frame including a target base disposed on an upper portion thereof and at least one guide rail. The press device may also include a backplate coupled to the target base extending vertically therefrom, and a linear actuator having a first end coupled to the frame and an opposite second end positioned to actuate over the frame toward the backplate. A tool mount may be coupled to the second end of the linear actuator and slidably coupled to the at least one guide rail such that the tool mount translates over the upper portion of the frame along the at least one guide rail when actuated by the linear actuator, and a fracturing tool may be mounted to the tool mount configured to fracture an object in response to actuation of the linear actuator.

According to yet another embodiment of the invention, a method for operating a press device includes providing a press device having a frame having a target base disposed over an upper portion thereof, a back support extending vertically from the frame adjacent the target base, a linear actuator mounted to the frame and positioned to actuate along a translation axis substantially parallel to the target base and toward the back support, a fracturing tool coupled to the linear actuator to actuate along the translation axis over the target base, and a first positioning actuator coupled to the frame to actuate along the target base in a direction substantially perpendicular to the translation axis. The method may also include placing an object on the target base between the fracturing tool and the back support, controlling the first positioning actuator to move the object into a desired position aligned with the fracturing tool, connecting a power unit operably to the linear actuator to selectively induce linear translation of the fracturing tool, and operating the power unit to fracture the object with the fracturing tool.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto.

As used herein, the terms substantially parallel, substantially perpendicular, and substantially horizontal refers to a relative position within ten degrees of parallel, perpendicular, and horizontal, respectively.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A press device comprising:

a frame having a target base disposed horizontally over an upper portion thereof;

a back support extending vertically from the frame adjacent the target base;

a linear actuator mounted to the frame and positioned to actuate along a translation axis substantially parallel to the target base and toward the back support;

a fracturing tool coupled to the linear actuator to actuate along the translation axis over the target base; and a first positioning actuator coupled to the frame to actuate along the target base in a direction substantially perpendicular to the translation axis;

wherein the fracturing tool comprises a wedge, a blade, or a punch configured to fracture a device, and wherein the device comprises an explosive device.

2. The press device of claim 1 wherein the linear actuator is positioned to actuate substantially horizontally.

3. The press device of claim 2 further comprising:

an open configuration above the target base; and one or more adjustable leveler feet coupled to a bottom surface of the frame to level the target base.

4. The press device of claim 1 wherein the linear actuator includes a pneumatic cylinder or a hydraulic cylinder.

5. The press device of claim 1 wherein the frame includes a plurality of guide rods extending parallel to the translation axis, and further comprising a tool mount coupling the fracturing tool to the linear actuator, the tool mount having a pair of openings formed therein to receive the plurality of guide rods such that the fracturing tool is supported by the plurality of guide rods when actuated by the linear actuator.

6. The press device of claim 1 further comprising a second positioning actuator coupled to the frame to actuate along the target base toward the back support.

7. A press device for fracturing an object comprising:

a frame having:

a target base disposed on an upper portion thereof, and at least one guide rail;

a backplate coupled to the target base and extending vertically therefrom;

a linear actuator having a first end coupled to the frame and an opposite second end positioned to actuate over the frame toward the backplate;

a tool mount coupled to the second end of the linear actuator and slidably coupled to the at least one guide rail such that the tool mount translates over the upper portion of the frame along the at least one guide rail when actuated by the linear actuator; and a fracturing tool mounted to the tool mount configured to fracture an object in response to actuation of the linear actuator;

wherein the object comprises an explosive object and the target base has a horizontal platform to support the explosive object.

8. The press device for fracturing an object of claim 7 wherein the at least one guide rail includes a plurality of guide rails; and wherein the tool mount includes a plurality of openings formed therein to receive the plurality of guide rails therethrough and the tool mount extends between the plurality of guide rails.

9. The press device for fracturing an object of claim 7 wherein the fracturing tool includes a changeable wedge removably coupled to the tool mount.

10. The press device for fracturing an object of claim 9 wherein the changeable wedge and the tool mount comprise respective first and second ends of a sliding dovetail joint coupled together.

11. The press device for fracturing an object of claim 7 further comprising:

a first positioning actuator coupled to the frame and configured to position the explosive object on the target base in a desired position aligned with the fracturing tool; and a second positioning actuator coupled to the frame and configured to hold the explosive object against the backplate.

12. The press device for fracturing an object of claim 11 further comprising a detachable base extension coupled to the frame configured to support an end of the explosive object opposite the first positioning actuator and adjacent the second positioning actuator.

13. The press device for fracturing an object of claim 12 wherein the first and second positioning actuators each have a translation screw and a stop; and wherein each stop includes:

a first plate coupled to an end of the translation screw configured to contact and position an object on the target base, and a second plate coupled at an angle to an upper portion of the first plate.

14. The press device for fracturing an object of claim 7 further comprising one or more cameras removably attached to the press device.

15. The press device for fracturing an object of claim 14 wherein the one or more cameras includes a first camera removably mounted on the tool mount and a second camera removably mounted on the frame or the backplate.

16. A method for operating a press device comprising:

providing a press device comprising:

a frame having a target base disposed over an upper portion thereof, a back support extending vertically from the frame adjacent the target base, a linear actuator mounted to the frame and positioned to actuate along a translation axis substantially parallel to the target base and toward the back support, a fracturing tool coupled to the linear actuator to actuate along the translation axis over the target base, and a first positioning actuator coupled to the frame to actuate along the target base in a direction substantially perpendicular to the translation axis;

placing an object on the target base between the fracturing tool and the back support;

controlling the first positioning actuator to move the object into a desired position aligned with the fracturing tool;

controlling a second positioning actuator coupled to the frame configured to actuate in a direction substantially parallel to the translation axis to secure the object against the back support;

connecting a power unit operably to the linear actuator to selectively induce linear translation of the fracturing tool; and operating the power unit to fracture the object with the fracturing tool.

17. The method of claim 16 wherein the object includes an explosive device; and further comprising manually lifting and transporting the press device to a desired location for fracturing the explosive device; and wherein placing the object on the target base includes operating a robot to lift and transfer the explosive device to the target base.

18. The method of claim 16 further comprising viewing images from a camera system mounted on the press device to determine a position of the object when controlling the first and second positioning actuators.

19. The method of claim 16 wherein the linear actuator comprises a hydraulic cylinder; and the power unit comprises:

a liquid reservoir, a pump operably coupled to the liquid reservoir and the hydraulic cylinder, a prime mover driving the pump to pressurize liquid from the liquid reservoir and provide the pressurized liquid selectively to the hydraulic cylinder, and an energy source configured to power the prime mover; and wherein operating the power unit to fracture the object with the fracturing tool includes operating the power unit via a remote control.

20. The method of claim 16 wherein the object comprises an explosive device.

* * * * *